(12) United States Patent
Niwa et al.

(10) Patent No.: US 11,732,758 B2
(45) Date of Patent: Aug. 22, 2023

(54) ASSEMBLY METHOD AND ASSEMBLY APPARATUS FOR CROSS SHAFT UNIVERSAL JOINT

(71) Applicant: KOYO MACHINE INDUSTRIES CO., LTD., Osaka (JP)

(72) Inventors: Hiroyuki Niwa, Yao (JP); Takeshi Koyama, Yao (JP)

(73) Assignee: KOYO MACHINE INDUSTRIES CO., LTD., Osaka (JP)

( * ) Notice: Subject to any disclaimer, the term of this patent is extended or adjusted under 35 U.S.C. 154(b) by 319 days.

(21) Appl. No.: 17/020,341

(22) Filed: Sep. 14, 2020

(65) Prior Publication Data

US 2021/0102583 A1   Apr. 8, 2021

(30) Foreign Application Priority Data

Oct. 8, 2019 (JP) ................................ 2019-185282

(51) Int. Cl.
| | |
|---|---|
| *F16D 3/38* | (2006.01) |
| *F16C 43/04* | (2006.01) |
| *F16D 3/40* | (2006.01) |

(52) U.S. Cl.
CPC .............. *F16D 3/385* (2013.01); *F16C 43/04* (2013.01); *F16D 3/405* (2013.01); *F16D 3/40* (2013.01); *F16D 2250/0084* (2013.01); *Y10T 29/49945* (2015.01)

(58) Field of Classification Search
CPC ... F16D 3/385; F16D 3/405; F16D 2250/0084
See application file for complete search history.

(56) References Cited

U.S. PATENT DOCUMENTS

| | | | | | |
|---|---|---|---|---|---|
| 3,230,617 | A | * | 1/1966 | Spiess ..................... | F16D 3/382 29/406 |
| 3,290,754 | A | * | 12/1966 | Pitner ...................... | F16D 3/41 29/898.07 |
| 3,529,942 | A | * | 9/1970 | Pitner .................... | F16D 3/405 29/434 |

(Continued)

FOREIGN PATENT DOCUMENTS

| | | |
|---|---|---|
| JP | S63-200932 A | 8/1988 |
| JP | 2007-309473 A | 11/2007 |

(Continued)

*Primary Examiner* — Sarang Afzali
(74) *Attorney, Agent, or Firm* — Studebaker & Brackett PC (57) ABSTRACT

An assembly apparatus includes backup jigs, a press-fitting and caulking part, and an expansion part. The backup jigs is configured to back up arms of a yoke of the cross shaft universal joint from inside in an axial direction. The press-fitting and caulking part is configured to press-fit cup bearings from outside in the axial direction between bearing holes of the arms and a shaft portion of a cross shaft, and configured to caulk the cup bearings. The expansion part is configured to push a wedge body between the backup jigs and to expand the arms outward via the backup jigs. The press-fitting and caulking part is configured to press-fit the cup bearings and to caulk the cup bearings in a state in which the arms are expanded. The expansion part is configured to release an expansion of the arms after the press-fitting and caulking of the cup bearings.

3 Claims, 11 Drawing Sheets

(56) References Cited

U.S. PATENT DOCUMENTS

| | | | | |
|---|---|---|---|---|
| 3,701,189 A | * | 10/1972 | Kadono | F16D 3/41 |
| | | | | 29/898.07 |
| 4,704,782 A | * | 11/1987 | Spiess | F16D 3/405 |
| | | | | 29/434 |
| 10,533,611 B2 | * | 1/2020 | Murata | F16D 3/387 |
| 2017/0089397 A1 | * | 3/2017 | Murata | F16D 3/382 |

FOREIGN PATENT DOCUMENTS

| JP | 2007-321904 A | 12/2007 |
|---|---|---|
| JP | 2015-218753 A | 12/2015 |

* cited by examiner

ASSEMBLY METHOD AND ASSEMBLY APPARATUS FOR CROSS SHAFT UNIVERSAL JOINT

CROSS-REFERENCE TO RELATED APPLICATIONS

This application is based on and claims priority from Japanese Patent Application No. 2019-185282 filed on Oct. 8, 2019, the contents of which are incorporated herein by reference.

TECHNICAL FIELD

The present disclosure relates to an assembly method and an assembly apparatus for a cross shaft universal joint.

BACKGROUND ART

Figure 17:
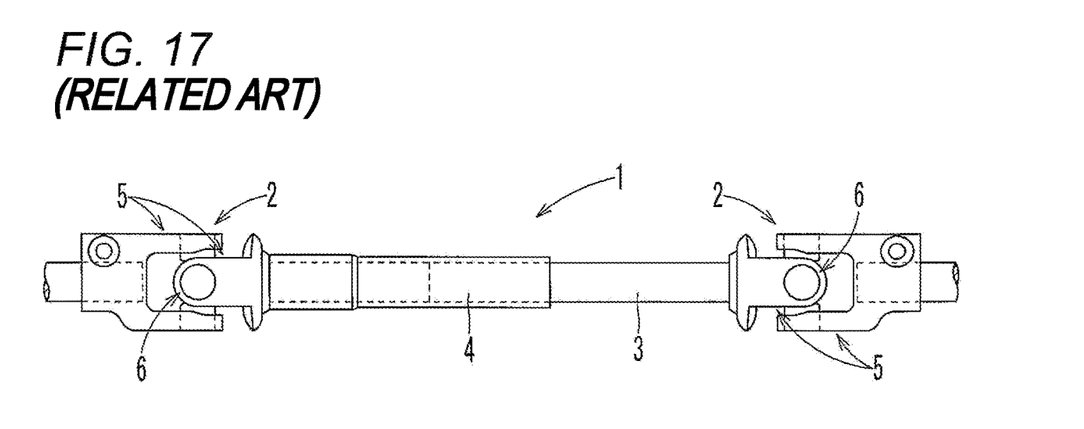
FIG. 17 is a front view of an intermediate shaft of a steering apparatus.
Figure 18:
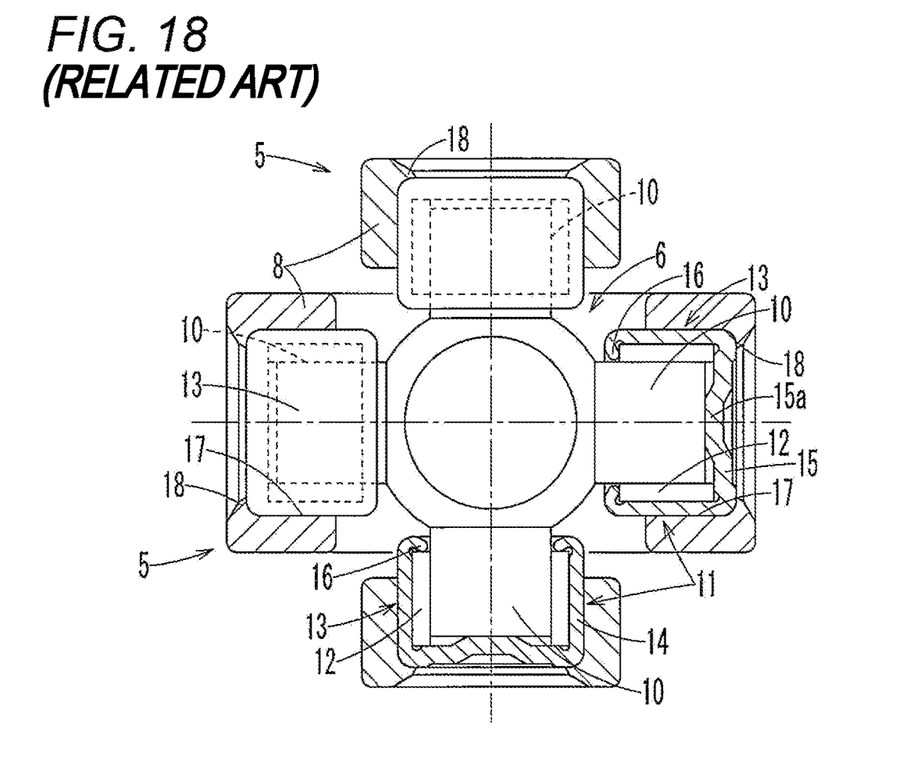
FIG. 18 is a cross-sectional view of a cross shaft universal joint.
Figure 19:
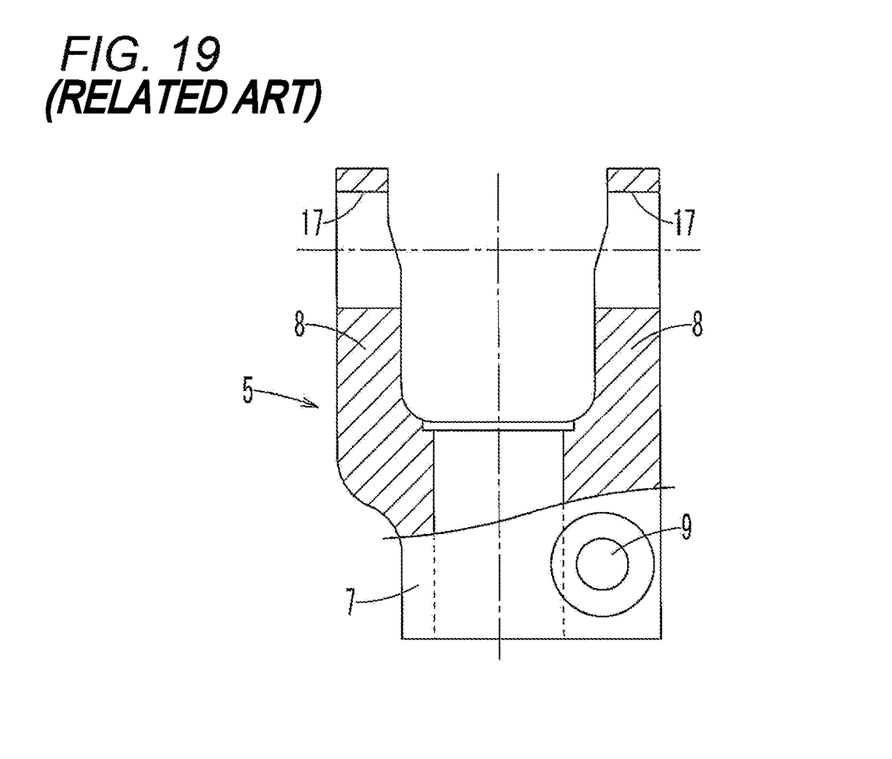
FIG. 19 is a partially cutaway front view of the yoke.

As shown in FIG. 17, an automobile is provided with a steering apparatus including a telescopic shaft 1 which can be telescopic and a pair of cross shaft universal joints 2 at both ends of the telescopic shaft 1. The telescopic shaft 1 concentrically includes an inner shaft 3 and an outer shaft 4 that are telescopically fitted to each other by spline fitting or the like. As shown in FIG. 18, each cross shaft universal joint 2 includes a pair of yokes 5 and a cross shaft 6 that connects the pair of yokes 5 in a bendable manner. As shown in FIG. 19, each yoke 5 includes a tubular base portion 7 and a pair of arms 8 that protrude from the base portion 7. In the pair of yokes 5, one yoke 5 has a base portion 7 fixed to a shaft such as the inner shaft 3 and the outer shaft 4 by welding or the like, and the other yoke 5 has a base portion 7 detachably connected to a steering shaft or the like via a connecting pin 9.

The cross shaft 6 includes a pair of shaft portions 10 arranged in a cross shape. One shaft portion 10 is rotatably connected to a pair of arms 8 of one yoke 5 via cup bearings 11. The other shaft portion 10 is rotatably connected to a pair of arms 8 of the other yoke 5 via cup bearings 11. Each cup bearing 11 includes needles 12 disposed in a circumferential direction on an outer periphery of a shaft portion 10, and a bearing cup 13 that is to be press-fitted into a bearing hole 17 of each arm 8 and holds the needles 12. The bearing cup 13 includes a cylindrical portion 14, a bottom portion 15 integrally formed on an outer side of the cylindrical portion 14, and a disconnection prevention portion 16 integrally formed with the cylindrical portion 14 on a side opposite to the bottom portion 15. The cylindrical portion 14 is fitted into the bearing hole 17 of the arm 8. Cup bearings 11 are fixed so as not to be disconnected by a plurality of caulking portions 18 in a circumferential direction each formed on an outer side in the axial direction of a bearing hole 17 of an arm 8.

In this type of cross shaft universal joint 2, an arrangement of the cross shaft 6 is settled by press-fitting positions of cup bearings 11 in the axial direction. When the press-fitting positions are displaced in the axial direction, the pair of yokes 5 interfere with each other, and a predetermined degree of bending cannot be secured. In order to absorb displacement of a cup bearing 11 in the axial direction, it is also conceivable to manufacture a large yoke 5, but automobile components in recent years have been reduced in weight for improvement in fuel consumption and reduction in environmental load, and tend to be smaller and smaller year by year. Therefore, increasing a size of the yoke 5 goes against a trend of recent years, and in order to obtain a predetermined degree of bending while reducing the size of the yoke 5, it is required that the cross shaft 6 be accurately disposed at a center between arms that is between a pair of arms 8 of a yoke 5.

On the other hand, due to manufacture of the yoke 5, the center between arms may be displaced from a center of the yoke 5 in terms of a dimension. If there is such a dimensional variation, the cross shaft 6 is assembled in a state where the cross shaft 6 is displaced in the axial direction from the center of the yoke 5. Therefore, it is necessary to accurately know the center between arms of the yoke 5 and to assemble the cross shaft 6 accurately so as to coincide with the center between arms.

According to JP2015218753A, when assembling a universal joint by using an assembly apparatus including backup jigs and press-fitting and caulking parts, after inserting the cross shaft 6 into the yoke 5, the backup jigs are driven to backup positions so as to back up the arms 8 outward in the axial direction with a predetermined pressing force. Meanwhile, by position control, an amount of displacement of a center between arms from a machine center is calculated based on the number of pulses of servo motors, command positions of the press-fitting and caulking parts in accordance with the amount of displacement are corrected, and the press-fitting and caulking parts are controlled based on the corrected positions, so that press-fitting and caulking are performed.

That is, after the yoke 5 is disposed on the assembly apparatus by causing the machine center between the pair of backup jigs to coincide with the center of the yoke 5, the backup jigs are moved outward in the axial direction away from the machine center by the servo motors, and outer side surfaces of the backup jigs are abutted against inner side surfaces of the arms 8 such that the backup jigs press the arms 8 outward with a predetermined backup force.

At this time, since a feed amount of the backup jigs from the machine center to the backup positions is known based on the number of pulses of the servo motors, the center between arms that is between two arms 8 is calculated based on the number of pulses, and the amount of displacement of the center between arms from the machine center is calculated.

When the center between arms is displaced from the machine center to one side in the axial direction by a predetermined amount, correction is made to a correction position obtained by adding the amount of displacement to a normal command position of the other press-fitting and caulking part and conversely to a correction position obtained by subtracting the amount of displacement from a normal command position of one press-fitting and caulking part, the cup bearings 11 are press-fitted into the bearing holes 17 of the arms 8 by the press-fitting and caulking parts based on the corrected positions, and the caulking portions 18 are caulked and fixed.

As explained in the above, according to JP2015218753A, the amount of displacement of the center between arms from the machine center is calculated first, and then a cup bearing 11 is press-fitted, caulked, and the like based on a position control that corrects command positions of the press-fitting and caulking parts in accordance with the amount of displacement. Therefore, a variation easily occurs in a gap in the axial direction between a bottom portion 15 of a bearing cup 13 of the cup bearing 11 and an outer end surface of a shaft portion 10 of the cross shaft 6. As a result, it causes generations of abnormal noise and deterioration of steering feeling.

When a press-fitting pin of a press-fitting part is advanced too much to close a gap in the axial direction, a cup of the bearing cup 13 of the cup bearing 11 may crack, or the bottom portion 15 of the bearing cup 13 is abutted against the outer end surface of the shaft portion 10 of the cross shaft 6, and a swinging torque (bending torque) may become excessive when the cross shaft universal joint 2 swings around the shaft portion 10 of the cross shaft 6 and is bent.

Further, the backup jigs press and back up the arms 8 outward in the axial direction. However, due to a fixed expansion amount of the arms 8, a variation may occur in a spring back amount of the arm 8, a gap may occur in the axial direction, or an excessive press-fitting amount may result in an excessive swinging torque.

SUMMARY

The present disclosure relates to an assembly method and an assembly apparatus for a cross shaft universal joint that can easily and reliably fix a cup bearing to a proper position by using spring back of an arm.

In an assembly method of a cross shaft universal joint, a pair of arms of a yoke are backed up from inside in an axial direction by a pair of backup jigs, and cup bearings are press-fitted from outside in the axial direction between bearing holes of the arms and a cross shaft inserted in the bearing holes. Each of the arms are expanded outward in the axial direction by each of the backup jigs. Each of the cup bearings are press-fit from the outside in the axial direction and caulked, with respect to each of the arms which is expanded. An expansion of each of the arms by each of the backup jigs are released after press-fitting and caulking each of the cup bearings.

An assembly apparatus includes backup jigs, a press-fitting and caulking part, and an expansion part. The backup jigs is configured to back up arms of a yoke of the cross shaft universal joint from inside in an axial direction. The press-fitting and caulking part is configured to press-fit cup bearings from outside in the axial direction between bearing holes of the arms and a shaft portion of a cross shaft, and configured to caulk the cup bearings. The expansion part is configured to push a wedge body between the backup jigs and to expand the arms outward via the backup jigs. The press-fitting and caulking part is configured to press-fit the cup bearings and to caulk the cup bearings in a state in which the arms are expanded. The expansion part is configured to release an expansion of the arms after the press-fitting and caulking of the cup bearings.

DESCRIPTION

Embodiments will be described in detail with reference to the drawings. The same reference numerals are given to the same names as those of a cross shaft universal joint 2 and the like described in FIGS. 17 to 19, and description thereof will be simplified.

Figure 1:
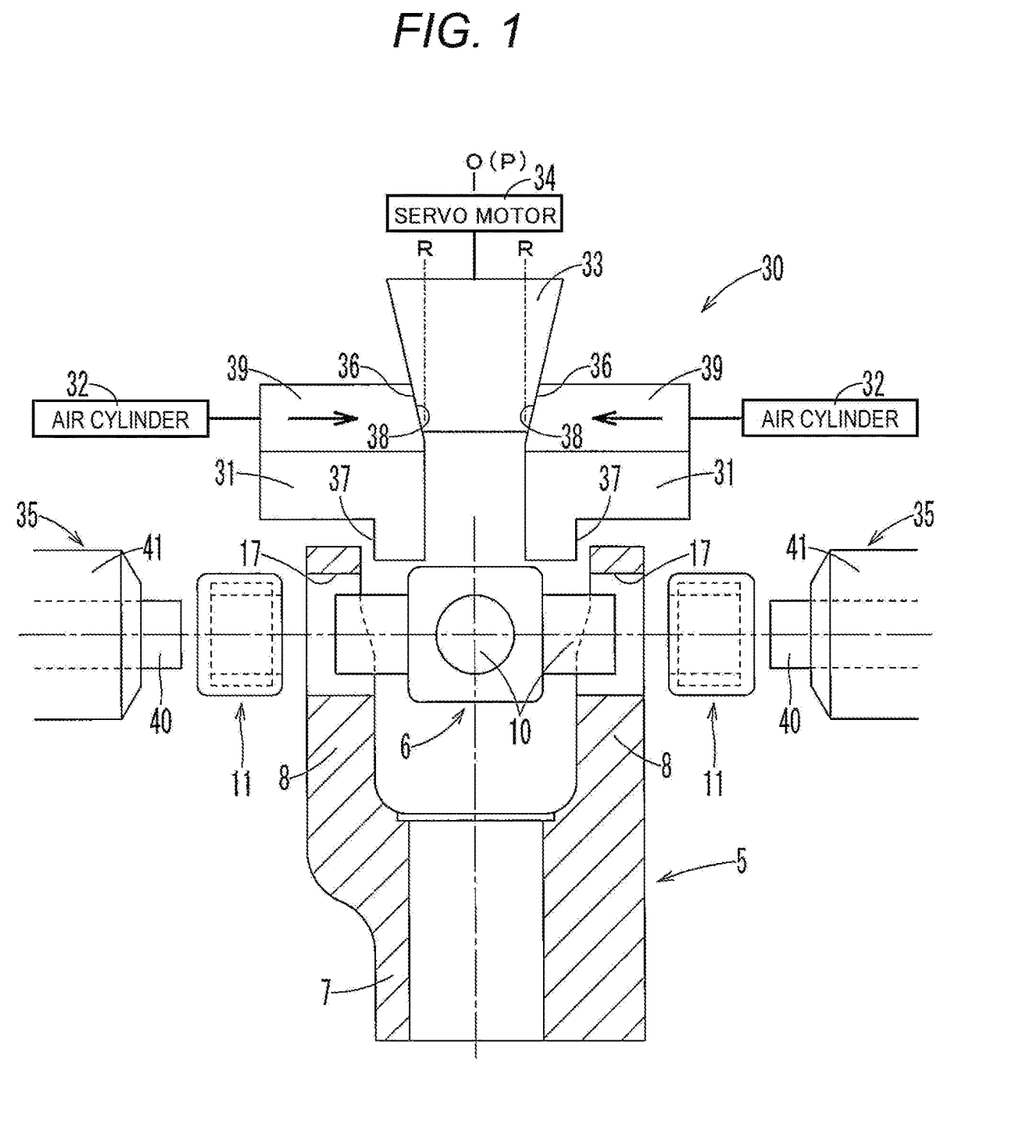
FIG. 1 is a configuration diagram of an assembly apparatus showing a first embodiment.

FIGS. 1 to 15C relate to an assembly method and an assembly apparatus for a cross shaft universal joint of a first embodiment. As shown in FIG. 1, an assembly apparatus 30 includes a pair of left and right backup jigs 31, a pair of left and right air cylinders (first driving parts) 32, a wedge body 33, a servo motor (second driving part) 34, and a pair of left and right press-fitting and caulking parts 35. The pair of left and right backup jigs 31 are movably supported in a right-left direction (axial direction) by a first guiding part (not shown). The pair of left and right air cylinders (first driving parts) 32 drive the backup jigs 31 in the right-left direction along the first guiding part. The wedge body 33 is disposed on a machine center O of the assembly apparatus 30 in the right-left direction, and is supported on the machine center O by a second guiding part (not shown) so as to be movable in an upper-lower direction. The servo motor (second driving part) 34 drives the wedge body 33 in the upper-lower direction along the second guide part. The pair of left and right press-fitting and caulking parts 35 press-fits cup bearings 11 each inserted between a bearing hole 17 of each arm 8 and a shaft portion 10 of a cross shaft 6 so as to form caulking portions 18.

The wedge body 33 includes a pair of left and right inclined portions 36 corresponding to the backup jigs 31. The inclined portions 36 are inclined at the same angle on left and right sides such that both inclined portions 36 form a narrowing-down taper, and are arranged on an upper side between the backup jigs 31. The servo motor 34 is provided on an upper side of the wedge body 33, and drives the wedge body 33 in the upper-lower direction via a transmission mechanism such as a screw shaft.

Each backup jig 31 is configured to back up each arm 8 from inside in the right-left direction when press-fitting the cup bearing 11 and forming a caulking portion 18. The backup jig 31 includes a contact portion 37 that can be in contact with an inner side surface of each arm 8 from inside in the left and right direction and an abutment portion 38 that can abut against an inclined portion 36 of the wedge body 33 from outside in the right-left direction.

Each contact portion 37 protrudes downward from an inner end side of the backup jig 31. Each abutment portion 38 is provided on an inner end side of an abutment plate 39 fixed on the backup jig 31, and is inclined at substantially the same angle as that of the inclined portion 36 so as to be in surface contact with the inclined portion 36 of the wedge body 33. Inclination angles of the inclined portion 36 and the abutment portion 38 are small such that the wedge body 33 can sufficiently withstand a reaction force from a side of the backup jig 31. Further, the backup jigs 31 and the wedge body 33 constitute an expansion part that expands the arms 8 of a yoke 5. The abutment portion 38 may be provided on the backup jig 31 by omitting the abutment plate 39.

A press-fitting and caulking part 35 includes a press-fitting pin 40 disposed in the right-left direction and a caulking punch 41 provided on an outer peripheral side of the press-fitting pin 40 concentrically inside and outside. The press-fitting pin 40 and the caulking punch 41 are separately driven by a driving part (not shown), and press-fitting of the cup bearing 11 and caulking of a caulking portion 18 are separately performed.

Figure 2:
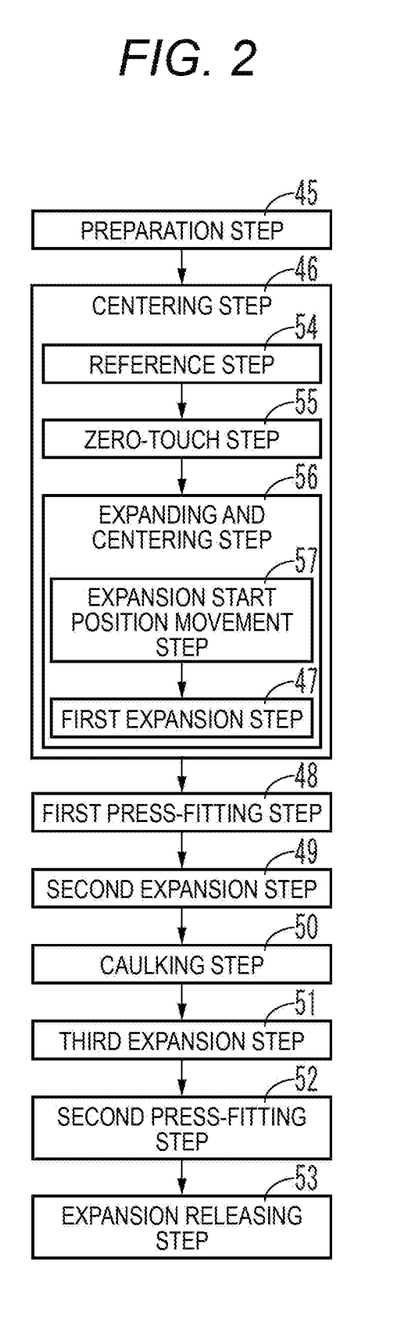
FIG. 2 is a block diagram of an assembly method according to the first embodiment.

As shown in FIG. 2, an assembly operation of the cross shaft universal joint 2 is performed through a preparation step 45, a centering step 46, a first press-fitting step 48, a second expansion step 49, a caulking step 50, a third expansion step 51, a second press-fitting step 52, and an expansion releasing step 53. The preparation step 45 includes a step of arranging yokes 5 and the cross shaft 6 on the assembly apparatus 30 and temporarily clamping the yokes 5 and the cross shaft 6. In the centering step 46, a centering is performed in which arms 8 of a yoke 5 are expanded to both sides in the right-left direction to a first expanded state Q1 (see FIG. 12), and a center P between arms coincides with the machine center O of the assembly apparatus 30. In the first press-fitting step 48, a first press-fitting is performed in which the cup bearings 11, each inserted between the bearing hole 17 of each arm 8 expanded to the first expanded state Q1 and the shaft portion 10 of the cross shaft 6, are pressed from outside in the right-left direction. In second expansion step 49, the arms 8 are further expanded to both sides in the right-left direction to a second expanded state Q2 (see FIG. 12) after the first press-fitting of the cup bearings 11. In the caulking step 50, the arms 8 expanded to the second expanded state Q2 are caulked, and the caulking portions 18 are formed. In the third expansion step 51, the arms 8 are further expanded to both sides in the right-left direction to a third expanded state Q3 (see FIG. 12) after forming the caulking portions 18. In the second press-fitting step 52, a second press-fitting is performed in which the cup bearings 11 is pressed in the bearing holes 17 of the arms 8 in the third expanded state Q3. In the expansion releasing step 53, the expansion of the arms 8 is released, after the second press-fitting of the cup bearings 11, so that the arms 8 are sprung back. In this description, a press-fitting in the first press-fitting step 52 may be referred as the first press-fitting, and a press-fitting in the second press-fitting step 49 may be referred as the second press-fitting.

That is, in the preparation step 45, the yokes 5, the cross shaft 6, and the like are set on the assembly apparatus 30. Shaft portions 10 of the cross shaft 6 are inserted in bearing holes 17 of the yoke 5. Further, the yoke 5 is temporarily clamped and is in a state of being movable in the right-left direction.

In the centering step 46, centering is performed such that the arms 8 of the yoke 5 temporarily fixed on the assembly apparatus 30 are expanded to both sides in the right-left direction to the first expanded state Q1, and the center P between arms of the yoke 5 coincides with the machine center O of the assembly apparatus 30 (see FIG. 1, and FIGS. 3 to 5).

The centering step 46 includes a reference step 54, a zero-touch step 55, and an expanding and centering step 56. In the reference step 54, the abutment portions 38 of the backup jigs 31 are butted against the inclined portions 36 of the wedge body 33 from the outside in the right-left direction so as to align the backup jigs 31 with reference positions R of a machine reference (see FIG. 1). In the zero-touch step 55, the contact portions 37 of the backup jigs 31 after the reference step 54 are caused to be in contact with inner side surfaces of tip end portions of the arms 8 so as to obtain zero-touch positions S (contact position) (see FIG. 3). In the expanding and centering step 56, the wedge body 33 is inserted between the backup jigs 31 at the zero-touch positions S, the arms 8 are expanded outward in the right-left direction via the backup jigs 31, and the center P between arms are aligned with the machine center O (see FIGS. 4 and 5). The yoke 5 is centered through the reference step 54, the zero-touch step 55, and the expanding and centering step 56.

First, in the reference step 54, the backup jigs 31 are moved inward in the right-left direction in directions indicated by arrows in FIG. 1 by driving the air cylinders 32, and the abutment portions 38 of the backup jigs 31 are abutted against the wedge body 33 at the machine center O from both left and right sides (see FIG. 1). At this time, the backup jigs 31 are stopped when the abutment portions 38 of the backup jigs 31 are abutted against the inclined portions 36 of the wedge body 33.

When the abutment portions 38 of the backup jigs 31 are abutted against the inclined portions 36 of the wedge body 33 as shown in FIG. 1, the center between both backup jigs 31 coincides with the machine center O. Therefore, the backup jigs 31 can be aligned with the reference positions R of the machine reference. Positions of the backup jigs 31 at this time are measured and read with a displacement meter and stored as the reference positions R of the backup jigs 31.

Figure 3:
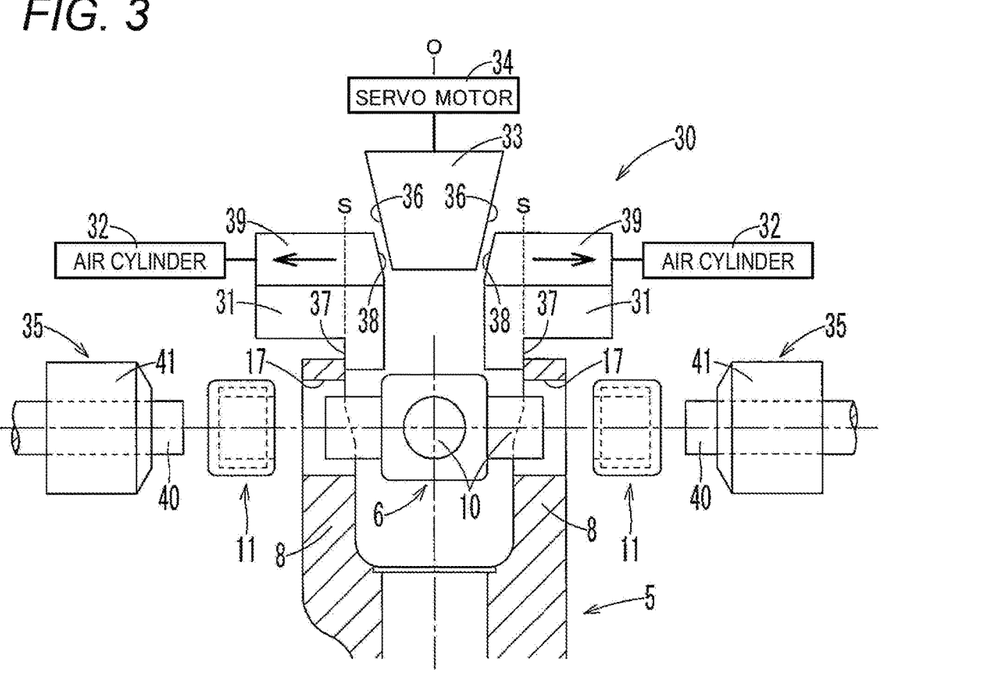
FIG. 3 is an illustrative view of a centering step according to the first embodiment.

In the zero-touch step 55, the backup jigs 31 are moved outward in the right-left direction in directions indicated by arrows in FIG. 3 by driving the air cylinders 32 in opposite directions, and the contact portions 37 of the backup jigs 31 are in contact with the inner side surfaces of the arms 8 of the yoke 5 on the assembly apparatus 30. At this time, the backup jigs 31 are stopped when the contact portions 37 of the backup jigs 31 are in contact with the inner side surfaces of the arms 8.

The backup jigs 31 are already positioned right-left symmetrically with respect to the machine center O, and the contact portions 37 of the backup jigs 31 positioned right-left symmetrically are in contact with the arms 8. Therefore, the contact portions 37 of the backup jigs 31 are in contact with the arms 8, so that the center P between arms of the arms 8 of the yoke 5 can substantially coincide with the machine center O. Positions of the backup jigs 31 at this time are measured and read with a displacement meter, and stored as the zero-touch positions S of the backup jigs 31.

Figure 14A:
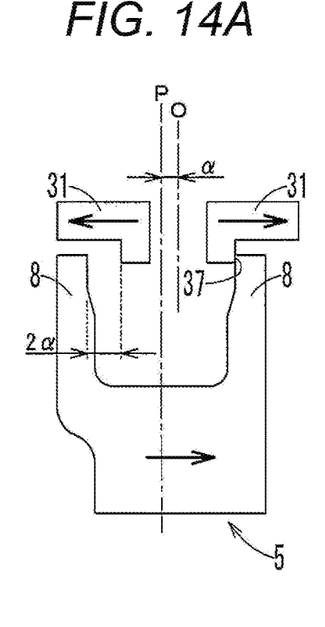
FIGS. 14A to 14C are illustrative views of movement of a yoke according to the first embodiment.
Figure 14B:
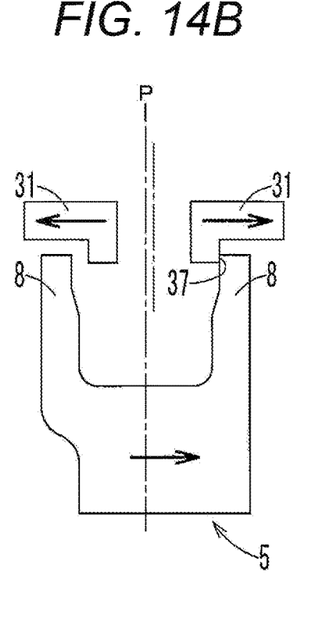
Figure 14C:
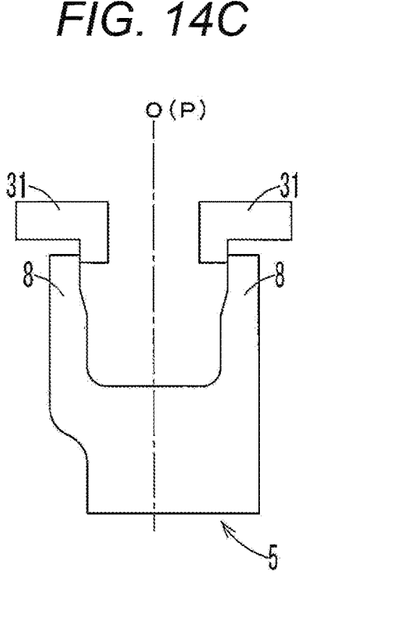

When the backup jigs 31 are moved outward in the right-left direction in the directions indicated by the arrows in FIG. 3 so as to cause the contact portions 37 to be in contact with the inner side surfaces of the arms 8, if the center P between arms of the yoke 5 substantially coincides with the machine center O as shown in FIG. 14C, the contact portions 37 of the backup jigs 31 are in contact with the arms 8 at substantially the same time.

However, in most of the yokes 5 arranged on the assembly apparatus 30, the center P between arms is displaced from the machine center O in either a left or right direction. For example, in a case where the center P between arms of the yoke 5 is displaced to a left side as shown in FIG. 14A, when the backup jigs 31 are moved outward in the right-left direction, a contact portion 37 of a backup jig 31 on a right side is in contact with an arm 8 on the right side first, and the yoke 5 is moved in a right direction together with the backup jig 31 on the right side.

The backup jigs 31 are moved in left and right directions that are opposite to each other. When the contact portion 37 of the backup jig 31 on the right side is in contact with the arm 8 on the right side, an interval between a contact portion 37 of a backup jig 31 on a left side and an arm 8 on the left side is 2α. Thereafter, as shown in FIG. 14B, as the backup jig 31 on the right side and the yoke 5 move, the interval between the contact portion 37 of the backup jig 31 on the left side that moves in an opposite direction and the arm 8 on the left side of the yoke 5 becomes smaller.

When the center P between arms of the yoke 5 coincides with the machine center O, the contact portion 37 of the backup jig 31 on the left side is in contact with an inner side surface of the arm 8 on the left side as shown in FIG. 14C. Then, if the contact portions 37 of the backup jigs 31 are in contact with the arms 8, the backup jigs 31 are stopped at the zero-touch positions S equidistant from the reference positions R (see FIG. 3).

The air cylinders 32 are low pressure types which generate necessary pressure for the abutment portions 38 of the backup jigs 31 being abutted against the inclined portions 36 of the wedge body 33 in the reference step 54, for the contact portions 37 of the backup jigs 31 being in contact with the arms 8 of the yoke 5 in the zero-touch step 55, or for moving the yoke 5 disposed at a displacement position in either one of the left and right directions so as to correct displacement. A driving of the air cylinders 32 is stopped after the abutment portions 38 are abutted against the inclined portions 36 or after the contact portions 37 are in contact with the arms 8, or the driving is stopped after a predetermined time after the contact. The air cylinders 32 do not have driving force for expanding the arms 8.

In this way, if the reference positions R can be obtained in the reference step 54 and the zero-touch positions S can be obtained in the zero-touch step 55, since an interval between the contact portion 37 and the abutment portion 38 in the right-left direction is already known, a dimension between arms of the yoke 5 can be calculated based on those reference positions R, zero-touch positions S, and the like.

When the backup jigs 31 are moved to the zero-touch positions S, the gap corresponding to an amount of movement from the reference position R in the reference step 54 to the zero-touch position S in the zero-touch step 55 is formed between the abutment portion 38 of each backup jig 31 and the inclined portion 36 of the wedge body 33 (see FIG. 3). If the reference position R, the zero-touch position S, an inclination of the inclined portion 36, and the like are known, a movement amount of the wedge body 33 in the upper-lower direction required for moving the wedge body 33 from a position in FIG. 3 to an expansion start position T (see FIG. 4) can be calculated. At the expansion start position T, the inclined portions 36 of the wedge body 33 are abutted against the abutment portions 38 of the backup jigs 31.

If the dimension between arms of the yoke 5 can be calculated, a movement amount of the wedge body 33 from the expansion start position T to a first expansion position corresponding to the first expanded state Q1, and movement amounts of the wedge body 33 at first to third expansion positions corresponding to the first to the third expanded states Q1 to Q3 can be calculated based on the inclination of the inclined portion 36 and the like.

The expanding and centering step 56 includes an expansion start position movement step 57, and a first expansion step 47. In the expansion start position movement step 57, the wedge body 33 is lowered so as to move the wedge body 33 to the expansion start position T. In the expansion start position T, the wedge body 33 is in contact with the abutment portions 38 of the backup jigs 31 at the zero-touch positions S (see FIG. 4). In the first expansion step 47, the wedge body 33 is lowered from the expansion start position T to the first expansion position, and the wedge body 33 is inserted between the abutment portions 38 of the backup jigs 31 at the expansion start position T so as to perform expansion to the first expanded state Q1 (see FIG. 5). Further, in this description, an expansion in the first expansion step 47 may be referred as a first expansion, and an expansion in the second expansion step 49 may be referred as a second expansion.

In this embodiment, in the first expansion step 47 of the centering step 46, when the yoke 5 is centered by expanding a space between the arms 8 to the first expanded state Q1, the arms 8 are expanded before the first press-fitting step 48 at that time.

However, when an expansion amount during centering is smaller than an expansion amount of the arms 8 before the first press-fitting step 48, the expansion step during centering and the expansion step before the first press-fitting may be separated, and expansion during centering may be performed first, and then expansion before the first press-fitting may be performed.

Figure 12:
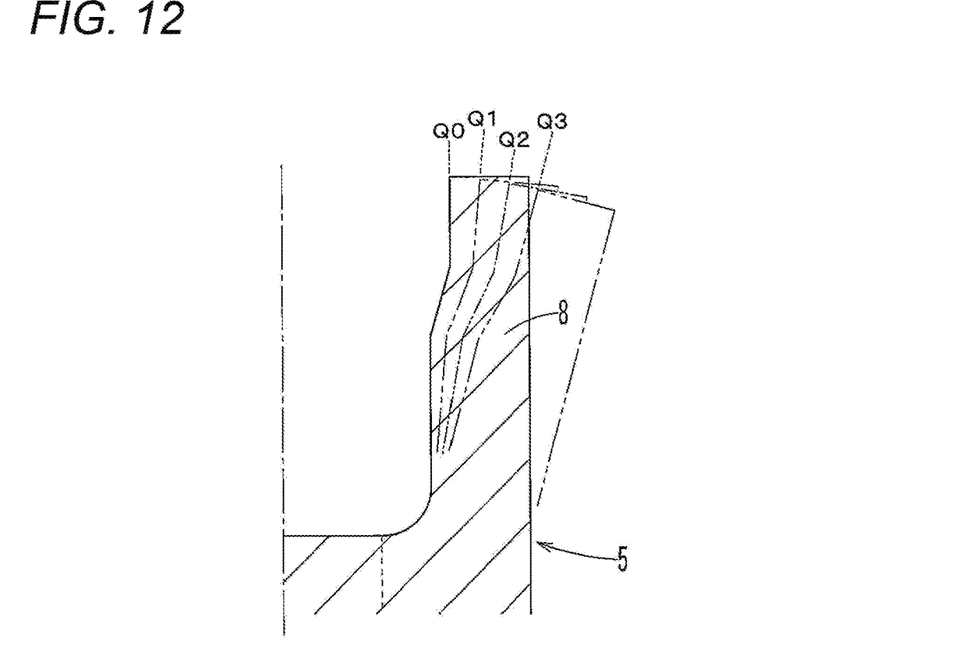
FIG. 12 is an illustrative view of an expanded state according to the first embodiment.

The first to third expanded states Q1 to Q3 when the arms 8 are expanded to a left side and a right side are predetermined by a dimension, a material, and the like of the yoke 5, and are set such that the expansion amount becomes large from the first expanded state Q1 in which an arm 8 is expanded outward by a predetermined amount from a normal position Q0 to the second expanded state Q2 and the third expanded state Q3 sequentially, as shown in FIG. 12.

Expansion amounts of the expanded states Q1 to Q3 are within a range in which the arms 8 can be elastically deformed without being plastically deformed. Further, the expansion amounts of the expanded states Q1 to Q3 may be slightly different from one another. When the expansion during centering and the expansion before the first press-fitting are separately performed, a centering expanded state Q01 may be provided between the normal state Q0 of the arm 8 and the first expanded state Q1.

Figure 4:
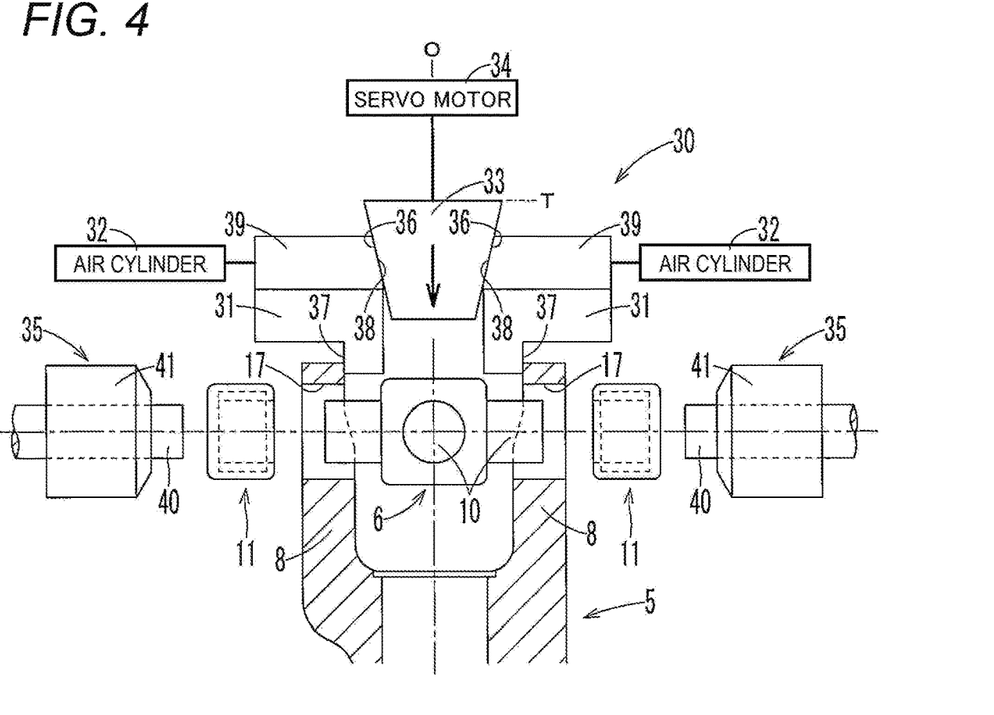
FIG. 4 is an illustrative view of the centering step according to the first embodiment.

In the expansion start position movement step 57, based on the expansion start position T, the servo motor 34 operates the wedge body 33 in a lowering direction and moves the wedge body 33 in the lowering direction by the calculated movement amount (see FIG. 4). When the wedge body 33 is lowered to the expansion start position T and the inclined portions 36 of the wedge body 33 are in contact with the abutment portions 38 of the backup jigs 31, the servo motor 34 is stopped and the wedge body 33 is stopped. An amount of lowering the wedge body 33 to the expansion start position T at this time is measured and managed by a displacement meter.

In the first expansion step 47, the servo motor 34 is operated in the lowering direction from the expansion start position T, and the wedge body 33 is moved in the lowering direction by the calculated second movement amount. When the wedge body 33 is lowered to the first expansion position and the wedge body 33 is inserted between the abutment portions 38 of the backup jigs 31 (see FIG. 5), the wedge body 33 presses the abutment portions 38 of the backup jigs 31 with a pressing force corresponding to inclinations of the inclined portions 36 of the wedge body 33. Therefore, due to a wedge action of the wedge body 33, a strong expansion force is generated outward in the right-left direction in the backup jigs 31, and the arms 8 are widened and expanded to the first expanded state Q1. The amount of lowering the wedge body 33 at this time is measured and managed by a displacement meter. Further, an actual expansion amount of an arm 8 is also measured and managed by a displacement meter.

Figure 5:
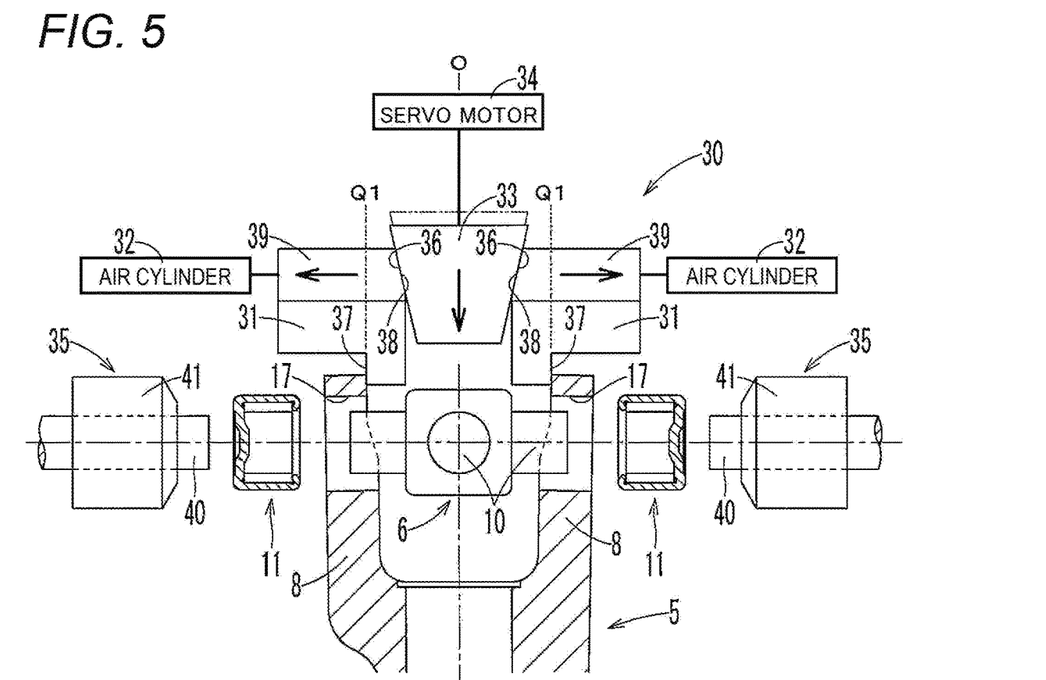
FIG. 5 is an illustrative view of a first expansion step according to the first embodiment.

As shown in FIG. 5, during first expansion of the arms 8, since the wedge body 33 is lowered while maintaining the machine center O, the backup jigs 31 are moved outward in the right-left direction by the same amount via the inclined portions 36. Further, since a strong force is applied to abutting portions between the inclined portions 36 of the wedge body 33 and the abutment portions 38 of the backup jigs 31 as well as abutting portions between the contact portions 37 of the backup jigs 31 and the arms 8, respective abutting portions receive a strong expansion force thereof and abut uniformly with no variation.

Therefore, the arms 8 are expanded to the predetermined first expanded state Q1, so that centering in which the center P between arms of the yoke 5 accurately and reliably coincides with the machine center O can be automatically performed.

Incidentally, even at a time point of the zero-touch step 55 before the expansion, although the center P between arms of the yoke 5 can be made to coincide with the machine center O, the abutting portions simply abut at this time point, and an abutting state varies among the abutting portions. Therefore, centering accuracy of the yoke 5 cannot be sufficiently secured. However, by expanding the arms 8 to the first expanded state Q1, since the variation in the abutting state among the abutting portions can be eliminated, the yoke 5 can be centered automatically, accurately, reliably, and highly precisely.

Further, by expanding the arms 8, the yoke 5 can be centered. Accordingly, even though the centering accuracy of the yoke 5 is high, operations of the centering step 46 is easy and a centering operation of the yoke 5 itself can be automatically and efficiently performed. Particularly, since the left and right arms 8 of the yoke 5 are expanded so as to center the yoke 5, even when dimension accuracy of the left and right arms 8 of the yoke 5 is deviated, it is not necessary to determine and correct an amount of displacement of the left and right arms 8, and the centering operation can be performed easily and rapidly.

Figure 6:
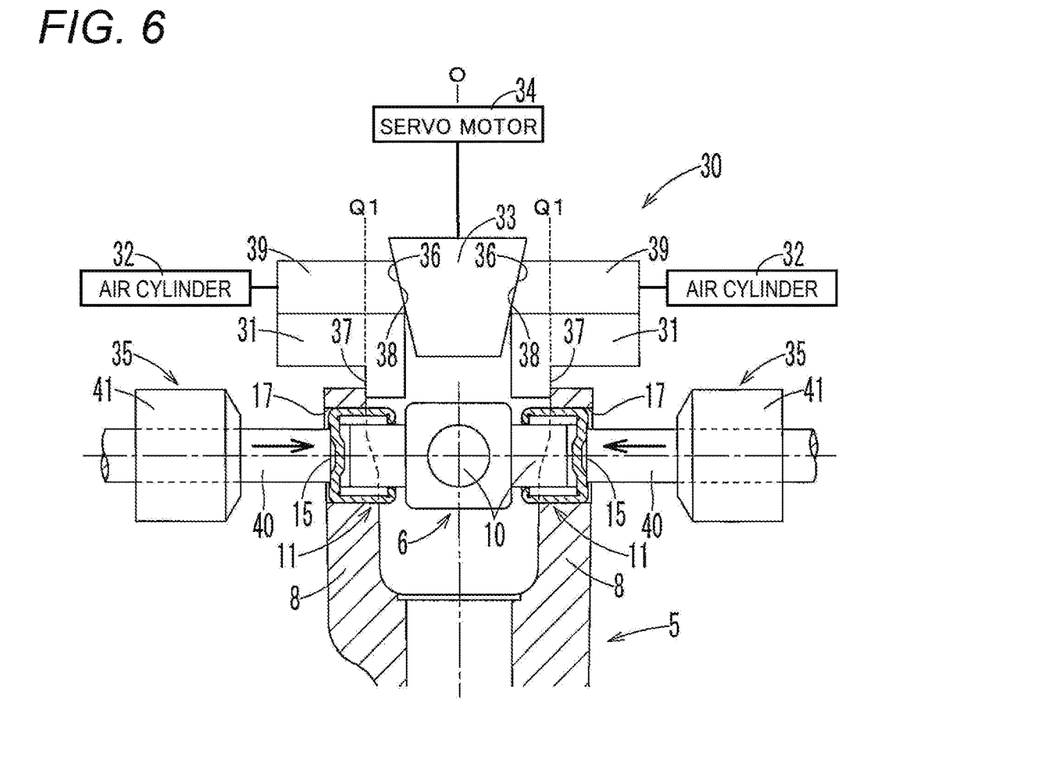
FIG. 6 is an illustrative view of a first press-fitting step according to the first embodiment.

When the wedge body 33 is lowered from the expansion start position T to the first expansion position by a predetermined movement amount so as to expand the arms 8 to the first expanded state Q1, since centering of the yoke 5 is completed during the expansion of the arms 8, by operating the press-fitting pins 40 of the press-fitting and caulking parts 35, the cup bearings 11 between the shaft portions 10 of the cross shaft 6 and the bearing holes 17 of the arms 8 are press-fitted from both left and right sides at substantially the same time, or are press-fitted sequentially one by one (the first press-fitting step 48) (see FIG. 6). Thereafter, even when the arms 8 are expanded in the second expansion step 49 and the third expansion step 51, the yoke 5 can maintain the centered state.

Figure 13:
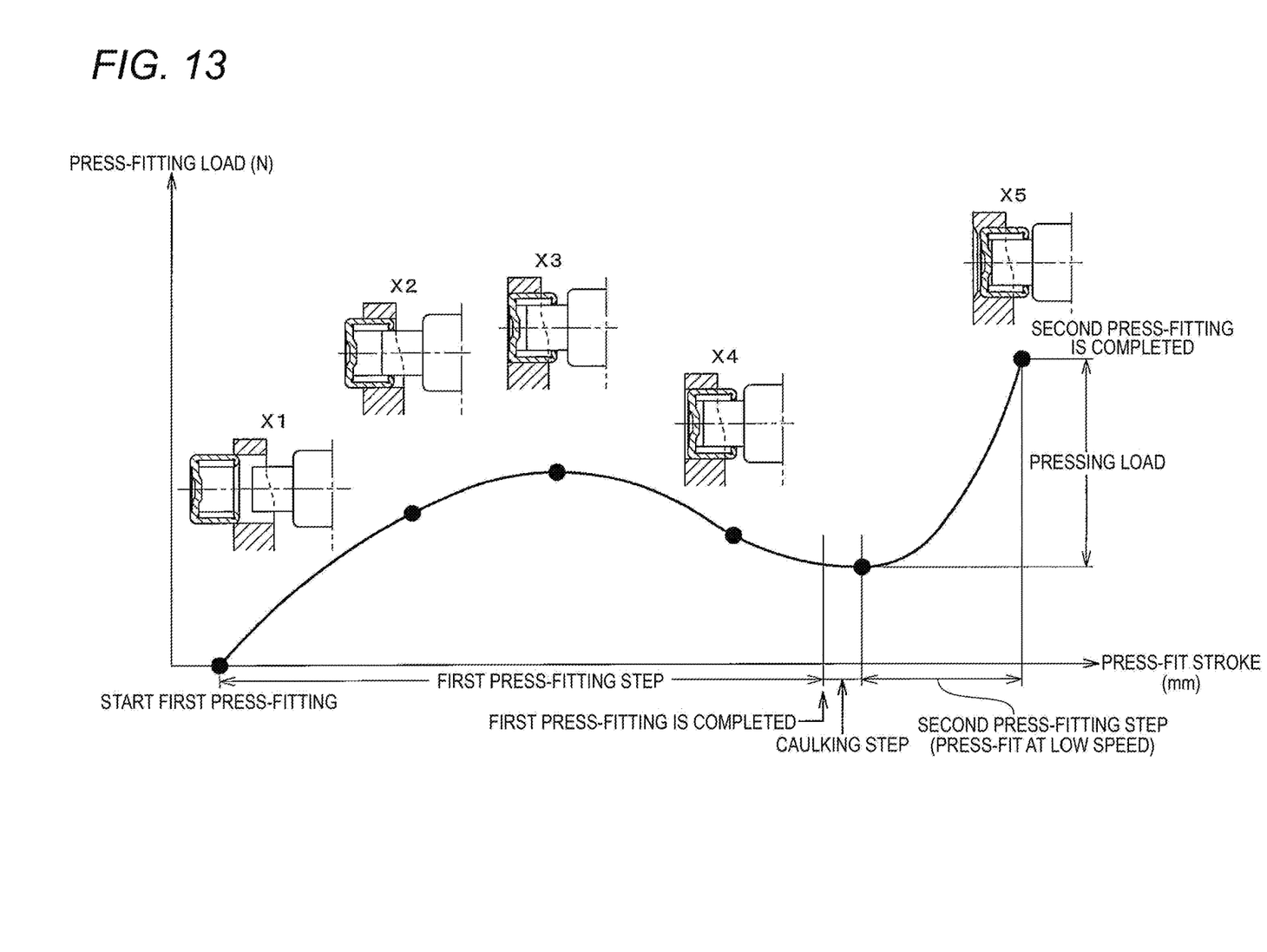
FIG. 13 is an illustrative view of a press-fitting load according to the first embodiment.

When press-fitting the cup bearing 11, a side of the bottom portion 15 of the cup bearing 11 is pressed inward in the right-left direction by a press-fitting pin 40 until the press-fitting pin 40 reaches a predetermined position. A press-fitting load at this time varies in accordance with a position of the cup bearing 11, as shown in FIG. 13. This is because an amount of fitting in the right-left direction between a cup bearing 11 and a bearing hole 17 of an arm 8 is changed by a press-fitting position of the cup bearing 11.

That is, when the cup bearing 11 is press-fitted to a fourth position X4 via a first position X1, a second position X2, and a third position X3 in FIG. 13 in the first press-fitting step 48, the press-fitting load increases as the amount of fitting in the right-left direction between a bearing cup 13 and the bearing hole 17 increases from the first position X1 after the press-fitting is started, through the second position X2, to the third position X3. When the third position X3 is exceeded where the fitting amount between the bearing cup 13 and the bearing hole 17 is maximum, the fitting amount therebetween gradually decreases, and the press-fitting load decreases until completion of the first press-fitting through the fourth position X4.

The press-fitting load when the cup bearing 11 is press-fitted to the fourth position X4 (or a time point at which the cup bearing 11 is press-fitted to a position where the first press-fitting is completed) is higher than that at a press-fitting start time point as shown in FIG. 13.

Figure 7:
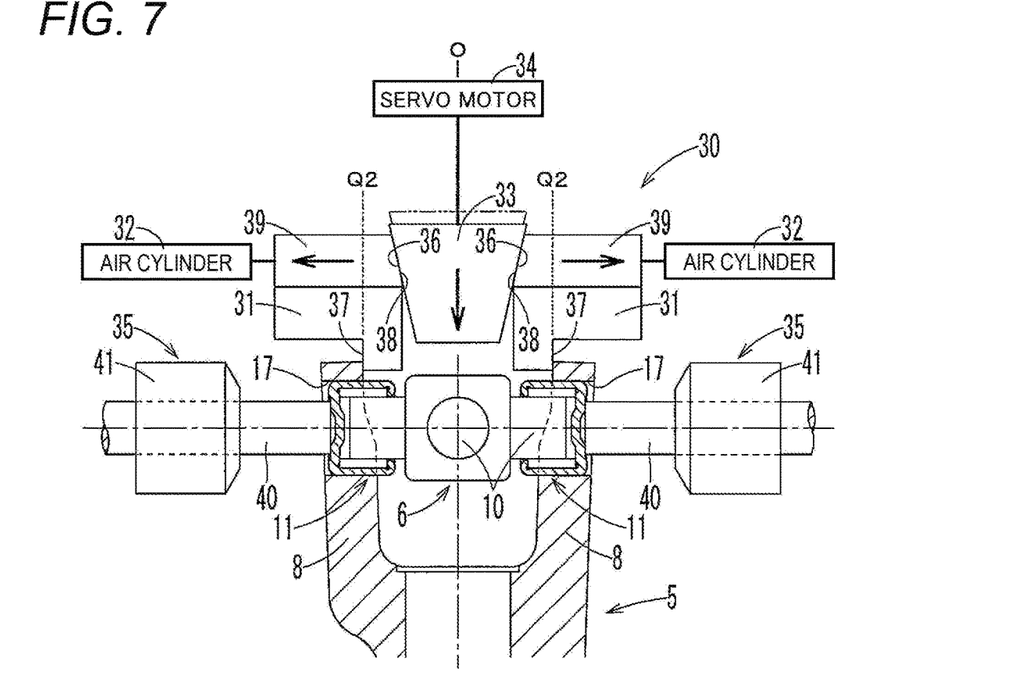
FIG. 7 is an illustrative view of a second expansion step according to the first embodiment.

When the first press-fitting of the cup bearing 11 is completed, in the second expansion step 49, the wedge body 33 is further lowered by driving of the servo motor 34 so as to insert the wedge body 33, and the arms 8 are expanded to the second expanded state Q2 while maintaining a centered state via the backup jigs 31 (the second expansion step 49) (see FIG. 7).

In FIG. 7, although the arms 8 are expanded to a left side and a right side while maintaining a first press-fitted state by the press-fitting pins 40, the first press-fitting may be released before expanding the arms 8 or the arms 8 may be expanded at substantially the same time as the release of the first press-fitting.

Figure 8:
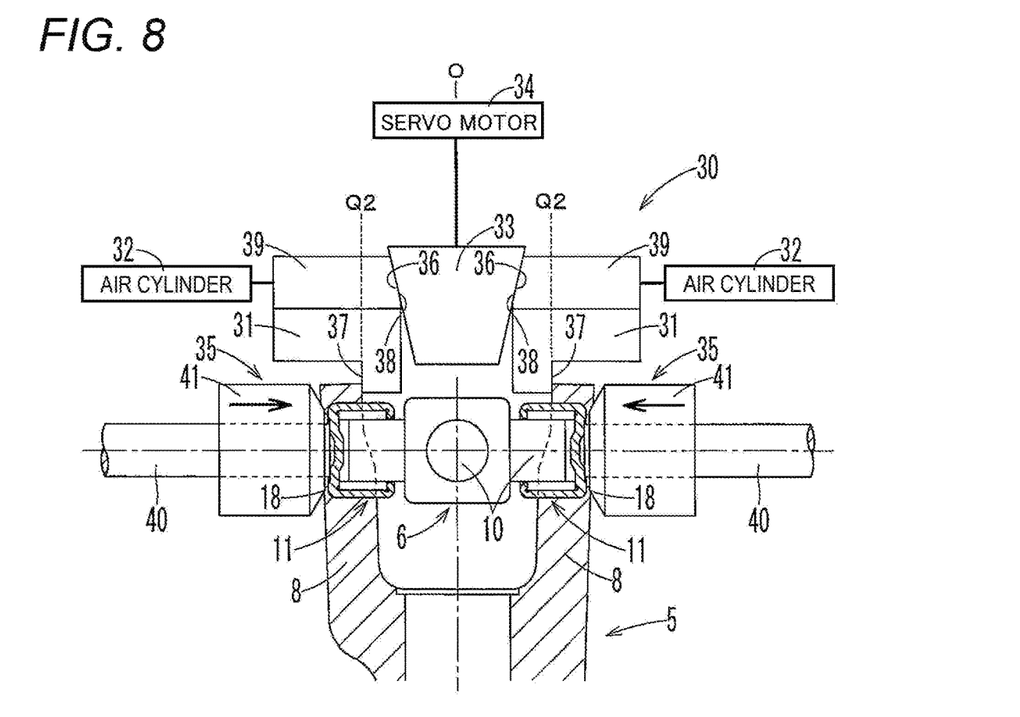
FIG. 8 is an illustrative view of a caulking step according to the first embodiment.

If the arms 8 are expanded to the second expanded state Q2, with the first press-fitted state maintained by the press-fitting pins 40, each caulking punch 41 is inserted into a bearing hole 17 of each arm 8 from outside in the right-left direction so as to form a caulking portion 18 on an inner periphery of the bearing hole 17 in proximity to an outer end side of the cup bearing 11, and the caulking portion 18 prevents the cup bearing 11 from coming off (the caulking step 50) (see FIG. 8).

A reason why the arms 8 are expanded from the first expanded state Q1 to the second expanded state Q2 while caulking is that a caulking load by a caulking punch 41 is larger than a press-fitting load by a press-fitting pin 40. If the arms 8 are expanded to the second expanded state Q2 in this way, even when a large caulking load is applied, an expansion load during the second expansion can sufficiently withstand against the caulking load. Therefore, the caulking portions 18 are formed in the second expanded state Q2 of the arms 8, so that the cup bearings 11 can be reliably prevented from disconnected.

An expansion amount from the first expanded state Q1 to the second expanded state Q2 may be determined in consideration of a difference between the press-fitting load and the caulking load. Therefore, if the difference between the press-fitting load and the caulking load is small, the amount of expansion to the second expanded state Q2 can be reduced.

If the expansion load of each arm 8 in the first expanded state Q1 is sufficiently large or the inclination of each inclined portion 36 of the wedge body 33 is small enough to sufficiently withstand a caulking load, expansion of each arm 8 to the second expanded state Q2 can be omitted.

Figure 9:
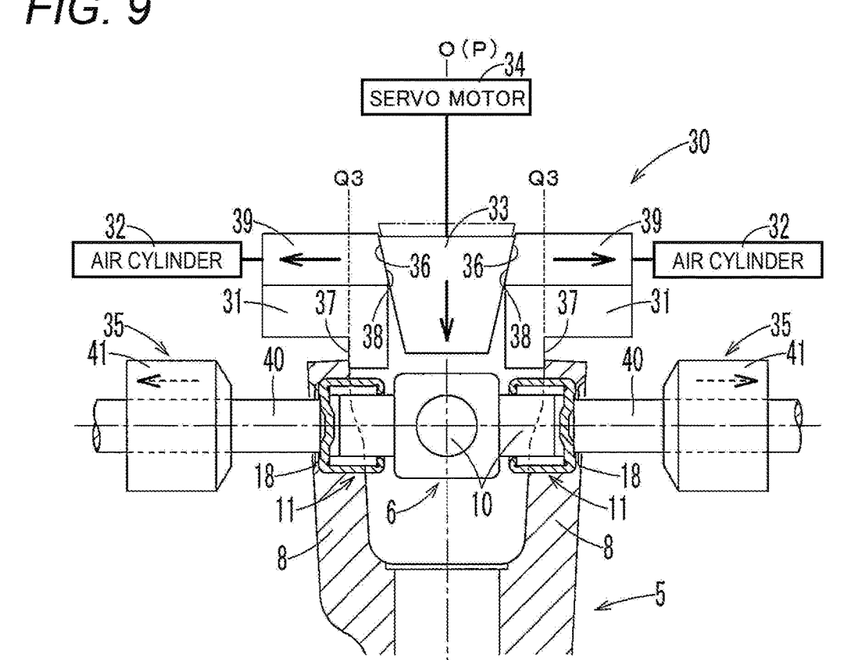
FIG. 9 is an illustrative view of a third expansion step according to the first embodiment.
Figure 10:
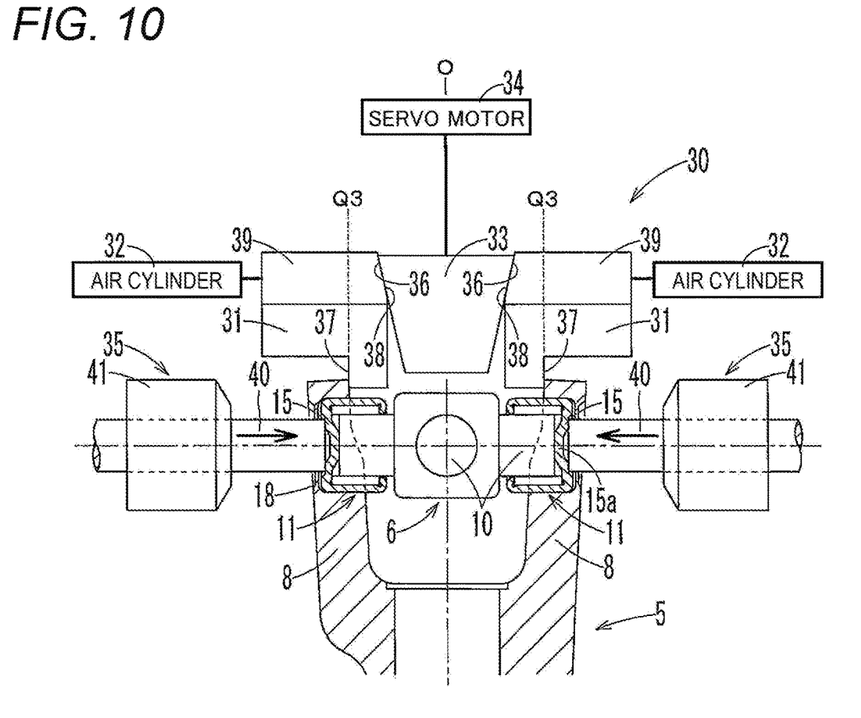
FIG. 10 is an illustrative view of a second press-fitting step according to the first embodiment.

When the caulking step 50 is completed, the wedge body 33 is further lowered by driving of the servo motor 34, and the arms 8 are expanded to the third expanded state Q3 while the centered state is maintained by the wedge body 33 via the backup jigs 31 (the third expansion step 51) (see FIG. 9). Then, if the arms 8 are expanded to the third expanded state Q3, each press-fitting pin 40 is inserted into the bearing hole 17 of each arm 8 from outside in the right-left direction, and the cup bearing 11 is secondly press-fitted until a predetermined press-fitting load is achieved (the second press-fitting step 52) (see FIG. 10).

The expansion amount from the second expanded state Q2 to the third expanded state Q3 may be determined in consideration of a difference between the caulking load and the second press-fitting load. Therefore, if the difference between the caulking load and the second press-fitting load is small, an amount of expansion to the third expanded state Q3 can be small.

If the expansion load of each arm 8 in the second expanded state Q2 is sufficiently large or the inclination of each inclined portion 36 of the wedge body 33 is small enough to sufficiently withstand the caulking load, expansion to the third expanded state Q3 can be omitted.

In the second press-fitting in the second press-fitting step 52, the press-fitting pin 40 is moved at a low speed in a press-fitting direction so as to press a convex portion 15a of the bearing cup 13 of the cup bearing 11 on a side of the bottom portion 15 toward an outer end surface side of the shaft portion 10 at a low speed. Therefore, as shown in FIG. 13, the press-fitting load during the second press-fitting can reliably press-fit the cup bearing 11 to a predetermined press-fitting position while increasing from a press-fitting load after the first press-fitting to a high press-fitting load by a pressing load. Further, although the press-fitting load during the second press-fitting is large, since each arm 8 is expanded from the second expanded state Q2 to the third expanded state Q3, the press-fitting load during the second press-fitting can be sufficiently withstood by the expansion load in the third expanded state Q3.

Figure 11:
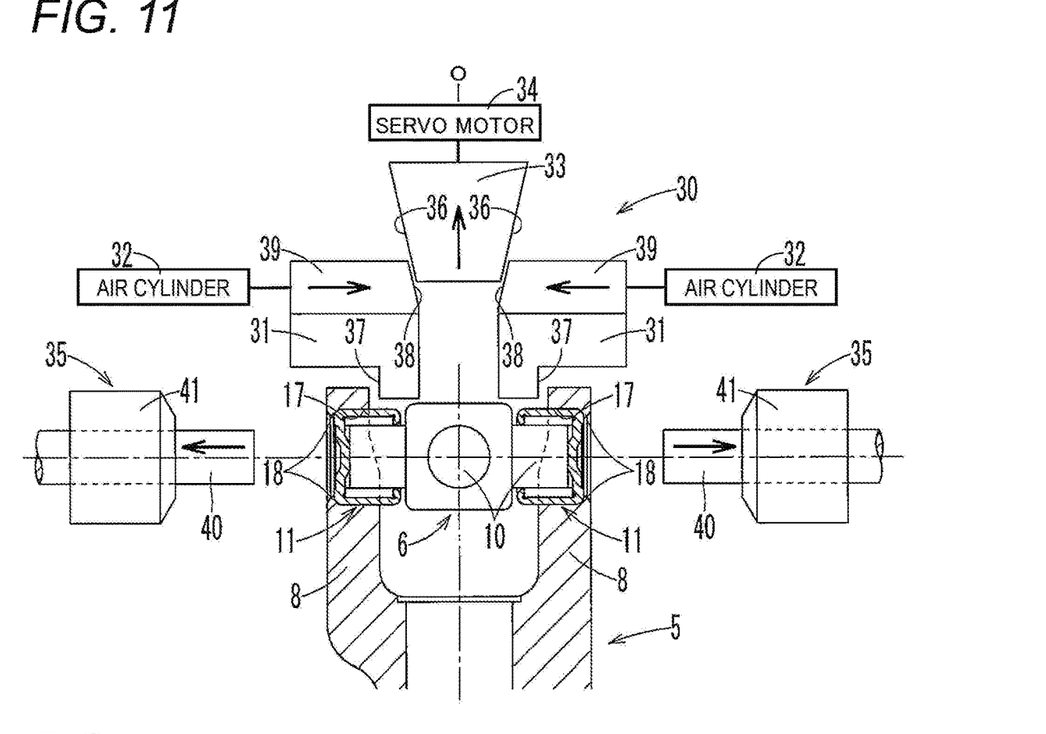
FIG. 11 is an illustrative view of an expansion releasing step according to the first embodiment.

When press-fitting loads during the second press-fitting of the cup bearings 11 reach a predetermined value and the press-fitting is completed, the wedge body 33 is raised by reverse driving of the servo motor 34 so as to release the third expanded state Q3 of the arms 8 (the expansion releasing step 53) (see FIG. 11). Thereafter, the backup jigs 31, the wedge body 33, and the like are returned to an original state and the processing ends.

In the expansion releasing step 53, when the expansion of the arms 8 in the third expanded state Q3 is released, a gap between each arm 8 and the cup bearing 11 is offset by spring back of each arm 8. Therefore, the cup bearing 11 in the bearing hole 17 of each arm 8 can be fixed without looseness.

Figure 15A:
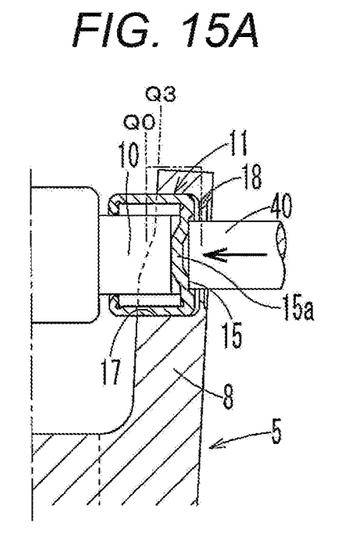
FIGS. 15A to 15C are illustrative views of spring back according to the first embodiment.
Figure 15B:
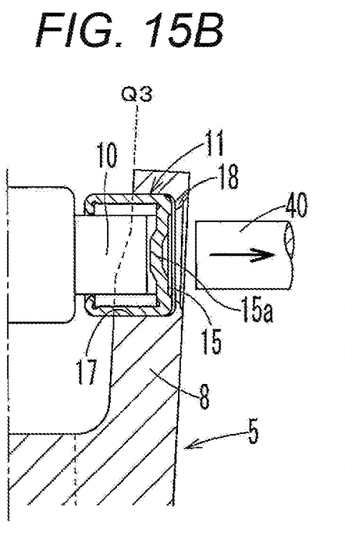
Figure 15C:
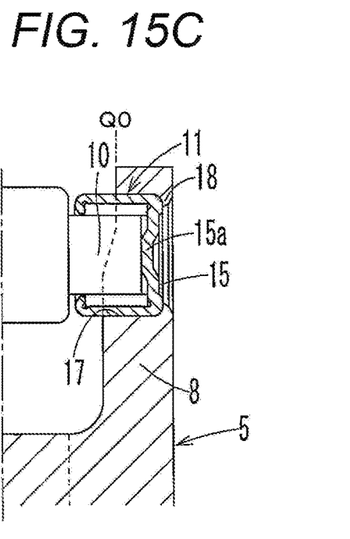

FIGS. 15A to 15C are conceptual diagrams when each arm 8 springs back. FIG. 15A shows a state when the cup bearing 11 is second press-fitted into each arm 8 in the third expanded state Q3. In the third expanded state Q3, if the press-fitting pin 40 is removed so as to release press-fitting, an end surface of the shaft portion 10 of the cross shaft 6 and a side of the bottom portion 15 of the bearing cup 13 are returned, and a gap is formed between the end surface of the shaft portion 10 and a convex portion 15a of the bottom portion 15 of the bearing cup 13 as shown in FIG. 15B. Thereafter, as shown in FIG. 15C, each arm 8 springs back inward in the right-left direction, whereby each cup bearing 11 moves inward in the right-left direction together with each arm 8. Therefore, an interval between the cup bearing 11 on the left side and the cup bearing 11 on the right side is narrowed, and the narrowed cup bearings 11 on both left and right sides can support one shaft portion 10 on the cross shaft 6.

Therefore, there is no looseness in the right-left direction between the cup bearing 11 and the shaft portion 10 of the cross shaft 6, and generation of an abnormal noise due to movement in the axial direction of the cross shaft 6 can be prevented. Further, since there is no gap where the cross shaft 6 is moved in the axial direction by the left and right arms 8 of the yoke 5, it is possible to prevent water, dust, and the like from entering.

Since the reference position R and the like are measured by the displacement meter every time assembly is performed, even when a contact location such as a contact portion between each inclined portion 36 of the wedge body 33 and the abutment portion 38 of each backup jig 31 is worn or the like, it is possible to prevent a decrease in assembly accuracy due to the wear or the like.

Figure 16:
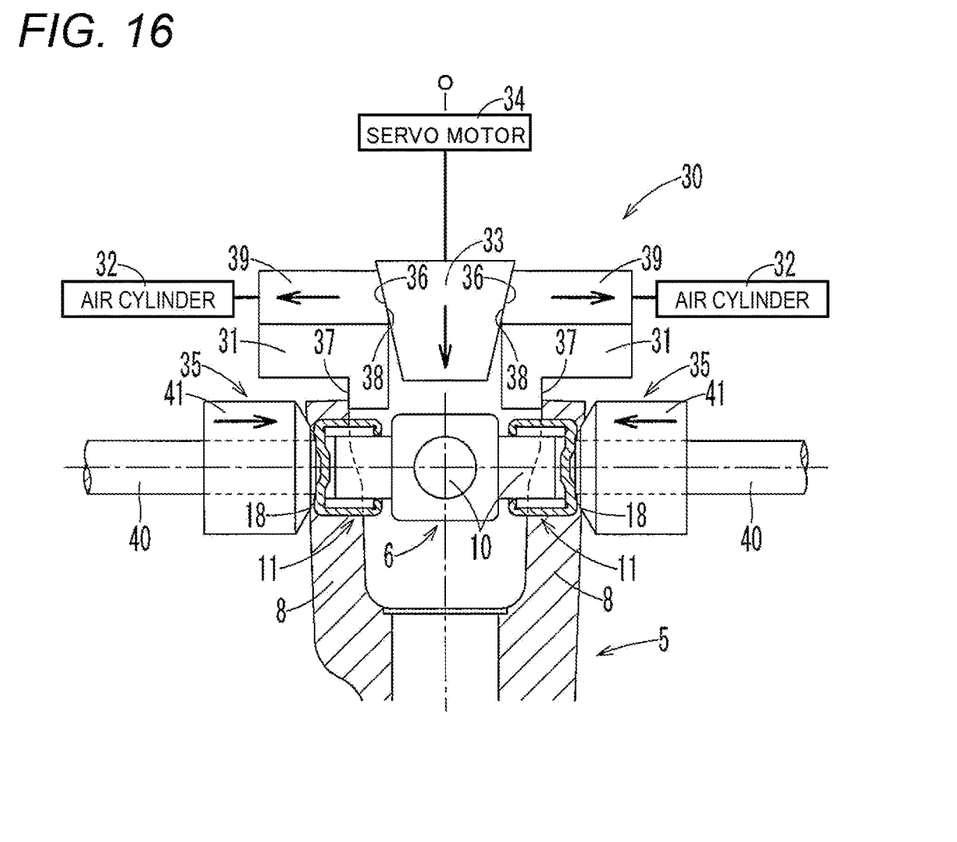
FIG. 16 is a configuration diagram illustrating a second embodiment.

FIG. 16 illustrates a second embodiment. When the second expansion step 49 and the caulking step 50 are performed, as shown in FIG. 16, the second expansion step 49 and the caulking step 50 can be performed at substantially the same time, or the caulking step 50 can also be immediately executed with a slight time difference following the second expansion step 49. That is, while lowering the wedge body 33 so as to secondly expand the arms 8 to the left side and the right side via the backup jigs 31, the arms 8 can be caulked from both left and right sides by the caulking punches 41 at substantially the same time as that of the second expansion, or the arms can be caulked by the caulking punches 41 with a slight time difference following the second expansion.

Also in this case, since an expansion force during the second expansion is applied to the arms 8 while the arms 8 are caulked by the caulking punches 41, a large caulking load during the caulking can be sufficiently withstood.

While the embodiments have been described in detail above, the present invention is not limited to the embodiments, and various modifications can be made without departing from the scope of the present invention. In the assembly apparatus 30 of the embodiments, the wedge body 33 is on an upper side with respect to the backup jigs 31, and the wedge body 33 is driven by the servo motor 34 on an upper side. However, the backup jigs 31, the wedge body 33, and the servo motor 34 may be arranged upside down. Further, various modifications may be made, such as disposing the wedge body 33 so as to move in the front-rear direction with respect to the backup jigs 31 that move in the right-left direction.

In the embodiments, the dimension between arms is calculated based on the reference position R, the zero-touch position S, and the like, and the expansion position of each arm 8 in the subsequent expanded state is calculated based on the dimension between arms. However, when there is a small variation in the dimension between arms or the like, the expansion position may be set in advance and the steps may be executed in accordance with the expansion position. Further, in the embodiments, although an operation is temporarily stopped at the expansion start position and expansion is performed from the expansion start position to the expansion position, stopping at the expansion start position may be omitted.

In the embodiments, a case is illustrated where the centering and expanding step 56 of the arms 8 in the centering step 46 of the yoke 5 and the subsequent first expansion step 47 of the arms 8 before the press-fitting step of the cup bearings 11 are commonly performed in one step. However, the centering and expanding step 56 of the arms 8 in the centering step 46 and the first expansion step 47 of the arms 8 before the first press-fitting step 48 of the cup bearings 11 may be performed separately.

In this case, in the centering step 46, the arms 8 are expanded within a range necessary for centering the yoke 5. In the first expansion step 47 of the arms 8 before the first press-fitting step 48 of the cup bearings 11, expansion from the centered and expanded state to the first expanded state Q1 may be performed within a range necessary for press-fitting the cup bearings 11.

If an expansion amount of the arms 8 in the first expansion step 47 is sufficient to withstand press-fitting and caulking, the cup bearings 11 may be firstly press-fitted and caulked in the first expanded state.

According to examples, there is an advantage that a cup bearing can be easily and reliably fixed to a proper position by using spring back of an arm.

What is claimed is:

1. An assembly method of a cross shaft universal joint in which a pair of arms of a yoke are backed up from inside in an axial direction by a pair of backup jigs, and cup bearings are press-fitted from outside in the axial direction between bearing holes of the arms and a cross shaft inserted in the bearing holes, the assembly method comprising:
    expanding each of the arms outward in the axial direction by each of the backup jigs;
    press-fitting each of the cup bearings from the outside in the axial direction and caulking each of the cup bearings, with respect to each of the arms in an expanded state;
    releasing an expansion of each of the arms by each of the backup jigs after press-fitting and caulking each of the cup bearings;
    a first expansion of expanding each of the arms to a first expanded state;
    a first press-fitting of press-fitting each of the cup bearings into each of the arms in the first expanded state;
    a second expansion of further expanding each of the arms to a second expanded state after press-fitting each of the cup bearings; and
    caulking each of the arms in the second expanded state,
    wherein a distance between the arms in the second expanded state is larger than a distance between the arms in the first expanded state.

2. The assembly method according to claim 1, further comprising:
    a third expansion of further expanding each of the arms to a third expanded state after the caulking of the each of the arms in the second expanded state; and
    a second press-fitting of press-fitting each of the cup bearings into each of the arms in the third expanded state,
    wherein a distance between the arms in the third expanded state is larger than a distance between the arms in the second expanded state.

3. An assembly method of a cross shaft universal joint in which a pair of arms of a yoke are backed up from inside in an axial direction by a pair of backup jigs, and cup bearings are press-fitted from outside in the axial direction between bearing holes of the arms and a cross shaft inserted in the bearing holes, the assembly method comprising:
    expanding each of the arms outward in the axial direction by each of the backup jigs;
    press-fitting each of the cup bearings from the outside in the axial direction and caulking each of the cup bearings, with respect to each of the arms in an expanded state; and
    releasing an expansion of each of the arms by each of the backup jigs after press-fitting and caulking each of the cup bearings,
    wherein a wedge body disposed at a machine center is pushed between the backup jigs so as to move the backup jigs outward in an expansion direction, in the expanding of the each of the arms.

* * * * *